(12) United States Patent
Betz (10) Patent No.: US 8,414,740 B2
(45) Date of Patent: Apr. 9, 2013

(54) APPARATUS FOR IMPREGNATING FIBROUS MATERIAL WITH A LIQUID

(76) Inventor: Günter Betz, Brittnau (CH)

( * ) Notice: Subject to any disclaimer, the term of this patent is extended or adjusted under 35 U.S.C. 154(b) by 0 days.

(21) Appl. No.: 12/997,624

(22) PCT Filed: Jun. 15, 2009

(86) PCT No.: PCT/EP2009/004295
§ 371 (c)(1),
(2), (4) Date: Dec. 13, 2010

(87) PCT Pub. No.: WO2009/149958
PCT Pub. Date: Dec. 17, 2009

(65) Prior Publication Data
US 2011/0094696 A1     Apr. 28, 2011

(30) Foreign Application Priority Data
Jun. 13, 2008   (DE) .......................... 10 2008 028 350

(51) Int. Cl.
*D21H 11/00* (2006.01)
(52) U.S. Cl.
USPC ........................................................ 162/265
(58) Field of Classification Search .................. 162/265, 162/266
See application file for complete search history.

(56) References Cited

U.S. PATENT DOCUMENTS

| 5,496,439 A | 3/1996 | Carlson et al. |
| 6,336,992 B1 * | 1/2002 | Blomquist ........................ 162/4 |
| 2005/0098291 A1 * | 5/2005 | Kangas et al. ................ 162/266 |

FOREIGN PATENT DOCUMENTS

| DE | 69924657 T2 | 1/2006 |
| EP | 1051551 B1 | 3/2005 |
| WO | 95/09267 | 4/1995 |
| WO | 98/35089 A1 | 8/1998 |

OTHER PUBLICATIONS

DE102008028350.9 Examination Report dated Feb. 13, 2009.
PCT/EP2009/004295 International Search Report, Sep. 2009.
Notification of the Second Office Action, Chinese Application No. 200980121878.8, dated Aug. 15, 2012.

* cited by examiner

*Primary Examiner* — Mark Halpern
(74) *Attorney, Agent, or Firm* — Michael Best & Friedrich LLP (57) ABSTRACT

Apparatus for dampening fibrous material using the alternating pressure process with an airtight and vapor-tight housing (1), with a vacuum line (6), wherein a first directional valve (7) is provided in the vacuum line (6), the housing (1) has at least one closable opening (2, 21, 23) for loading and unloading the housing (1) and a ventilating line (11), and wherein a third directional valve (12) is provided in the ventilating line (11).

11 Claims, 6 Drawing Sheets

APPARATUS FOR IMPREGNATING FIBROUS MATERIAL WITH A LIQUID

This application is a 371 of PCT/EP2009/004295 filed on 15 Jun. 2009.

BACKGROUND OF THE INVENTION

The present invention relates to an apparatus for wetting fibrous material, in particular wood, woodchips and waste paper.

Woodchips with a size of about 4 cm×2 cm×1 cm are decomposed into their fiber constituents by refiner grinding. This gives rise to the TMP fibrous substance required for papermaking (TMP=thermomechanical pulp). The higher the moisture content of the woodchips is, the more elastic, the softer and the more pliable is the composite fibrous structure within the woodchips and the individual fibers contained in the woodchip. Since, with an increasing length of the fibers, their strength increases, and such fibers are suitable for making high-grade papers, the aim is for the fibers to have as high moisture and elasticity as possible during the refiner grinding.

EP 1 051 551 discloses a method for wetting fibrous material composed of waste paper having a multilayer coating, such as, for example, beverage pasteboard. In beverage pasteboard, as it is known, both sides of the paper are coated with plastic and/or aluminum.

An apparatus and a method for the recovery of cellulose fibers from waste paper are known from U.S. Pat. No. 5,496,439. Here, the waste paper surrounded by a liquid is exposed in succession to underpressure and to overpressure.

SUMMARY OF THE INVENTION

The object on which the invention is based is to provide apparatuses, with the aid of which the wetting of woodchips or waste paper in bale form is possible in a simple and effective way.

In this context, wetting is understood to mean not only the moistening of the woodchips on their surface, but also the introduction of liquid, in particular water, in the overall volume of the woodchips. This means that not only the interspaces between the fibers of the woodchips, but also the interior of the fibers, are filled with a liquid.

This object is achieved, according to the invention, by means of an apparatus having the features of patent claim 1.

With the aid of the apparatus according to the invention, it is possible to wet fibrous material, whether in the form of woodchips or in the form of waste paper in bales, quickly and effectively with a liquid. In this case, the elasticity of the fibers and the change in volume of the fiber cavities on account of alternating pressures are utilized.

In pulp manufacture, the following principle applies: the moister the woodchips injected into the pulp digester are, the higher are the filling density and therefore the throughput capacity of the pulp digester. Moreover, using the apparatus according to the invention, it is possible to start filling the digester with digesting liquor at a markedly earlier stage, since the woodchips, if their moisture is sufficiently high, do not float when the digesting liquor is pumped in.

If hot digesting liquor is used for wetting the woodchips by the method according to the invention, the digesting time is additionally also shortened markedly, since hot digesting liquor is not only located between the fibers, but also within the fibers (Luumen=fiber cavity).

When round timber (grinding wood) is used for the production of mechanical wood pulp, as high a moisture content of the wood as possible is critical so as to keep the fraction of splinters and fines low. In this method, the wood fragments with a length of up to 2 meters are pressed with high pressure against a large rough grindstone and are thereby defibrated and pulverized. The moister the round timber is during this processing, the more elastic, the softer and the more pliable is the composite fiber structure in the overall wood fragment and each of its individual fibers and the lower is the fraction of splinters and fines. With such wood fragments, too, considerable quantities of energy and time can be saved, using an apparatus according to the invention.

However, it has arisen that dried foodstuffs, such as, for example, mushrooms, beans or apples, can be moistened in dried form quickly, cost-effectively and efficiently.

By means of the ventilation line according to the invention, it is possible to execute the alternation between underpressure and ambient pressure or overpressure more quickly and thereby further increase the effectiveness of moistening.

By means of the at least one closable orifice provided according to the invention, the apparatus can be operated in batch mode or, in the case of two or more orifices, continuously, so that this improved method flow also markedly increases the effectiveness and the throughput rate of the apparatus according to the invention.

In all fiber-containing materials which are to be wetted, according to the present invention the wetting liquid can be used in liquid form (liquid) or gaseous form (vapor) or in a combination of both. The wetting liquid may be water, solvent, an individual chemical or a chemical mixture. The wetting liquids may also be in vaporous form.

Also, all these wetting liquids, when employed and used in the present invention, may have a temperature ranging from very cold to boiling point.

The wetting agents employed may have a coloring, hydrophobic, hydrophilic, bleaching, resin and lignin-decomposing, impregnating, preserving and/or surface tension-lowering or surface tension-increasing character of inorganic or organic type.

It has proved to be especially advantageous if the housing has a closable first orifice for loading the housing and a closable second orifice for unloading the latter, because the effectiveness and throughput of fibrous material to be moistened can thereby be increased even further.

Depending on the preferred intended use and local conditions, the at least one orifice may be closed by means of a door, a flap, a slide, a valve, a plug screw, a sluice and/or a drain trap.

Doors and flaps are suitable especially for the introduction of large fibrous material fragments to be moistened, such as, for example, a bale of pressed waste paper, while a slide or valve is especially suitable when the fibrous material is in small fragments and is to be delivered continuously. The advantage of a door, flap, slide and valve is that the orifice can be closed in a defined way and therefore controlled and reproducible pressure conditions inside the housing always prevail. Closing off the orifice in a pressure-tight or gas-tight manner increases the rate of pressure alternation or the rate of pressure change, this having a positive influence upon the effectiveness of moistening.

The advantage of a plug screw is to be seen in that it can convey fibrous material, which is already wetted with the liquid, such as, for example, water or digesting liquor, into the housing continuously or intermittently and at the same time affords an airtight and vapor tight closure of the housing orifice. The plug screw is therefore suitable especially for continuous or quasi-continuous operation of a plant and may, for example, be coupled to a valve or a slide.

Furthermore, it is possible to close the orifices by means of a drain trap which is filled with a barrier liquid. It is thereby possible, without moved parts, to close off the orifices of the housing in an airtight and vapor tight manner. At the same time, it is possible, by means of this drain trap, to introduce the fibrous material into the housing and also convey it out of the housing. Since this drain trap is a passive closure element, the control of the apparatus according to the invention is also simplified.

So that the liquid quantity absorbed by the fibrous material and transported out of the housing together with the fibrous material can be compensated, in a further advantageous refinement of the invention a supply line for the medium with which the fibrous material is moistened is provided. Further, a regulating valve is provided in this supply line, so that the quantity of medium contained in the housing can be regulated according to a stipulated desired value.

In order further to accelerate moistening and the penetration of the liquid into the woodchips or into the waste paper stacks, a pressure line with a second directional valve may be provided. It is thereby possible not only to carry out a lowering of pressure, but, in alternation with this lowering of pressure, also to carry out a rise in pressure within the housing. By the amplitude of between the pressure maximum and pressure minimum being increased, moistening and the penetration of the liquid into the fibrous material to be moistened are further intensified.

The pressure line is advantageously connected to a compressed air generator and/or to a pressure vessel. It is thereby possible to build up the overpressure quickly, and at the same time, if a pressure vessel is used, the compressed air generator can be of smaller design and run continuously.

The same applies accordingly to the vacuum line which is connected to a vacuum generator and/or to a vacuum vessel.

In order to convey the fibrous material into the apparatus and out of the apparatus fully automatically, a conveying device is provided which is preferably designed as a conveyor worm, transport belt and/or chain conveyor. The conveying device may, however, even be dispensed with if the apparatus is placed sufficiently obliquely.

Depending on the required performance and the space conditions, it is possible to set up one or more housings so as to be connected in parallel and/or in series to one another. On the basis of standard modules, therefore, the performance of the apparatus can be adapted within broad limits to the requirements of an individual case.

BRIEF DESCRIPTION OF THE DRAWINGS

Further advantages and advantageous refinements of the invention may be gathered from the following drawing, its description and the patent claims. All the features disclosed in the drawing, its description and the patent claims may be essential to the invention both individually and in any combination with one another.

In the drawing:

FIG. 2 shows circuit diagrams of further exemplary embodiments of the apparatus according to the invention with two plug screws and with a conveyor worm, FIG. 3 shows exemplary embodiments of apparatuses according to the invention with drain traps and with a conveyor belt as a transport device or with a tubular chain conveyor.

DETAILED DESCRIPTION

Figure 1:
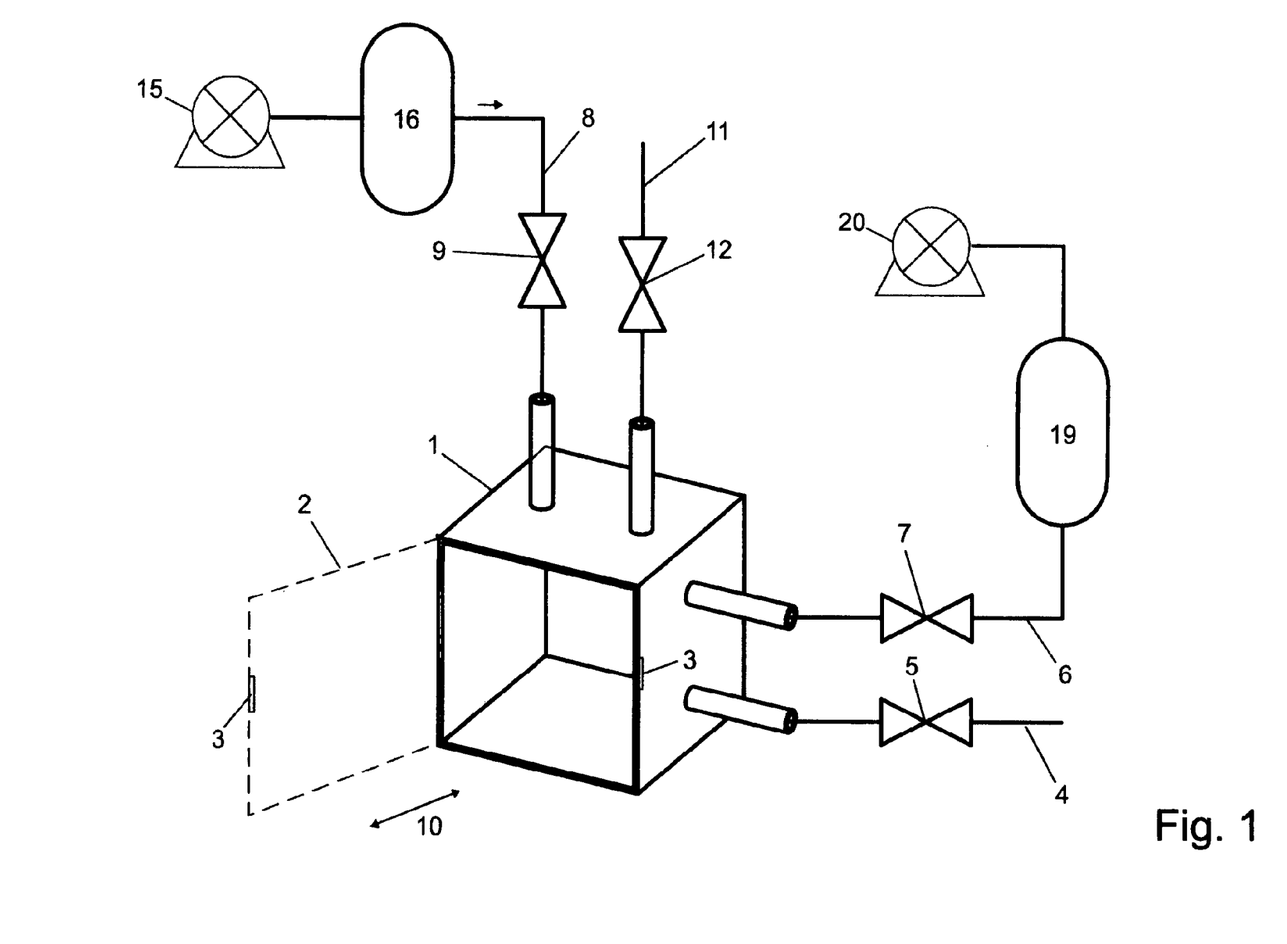
FIG. 1 shows a circuit diagram of the first exemplary embodiment of an apparatus according to the invention.

In the exemplary embodiment illustrated in FIG. 1, the housing is given the reference symbol 1. The housing 1 illustrated has a parallelepipedal geometry. A sidewall of the housing 1 is designed as a door 2 and can be closed, airtight and vapor tight, with the aid of a closure 3.

The apparatus according to the invention for wetting is illustrated diagrammatically, and greatly simplified, in FIG. 1. The structural details are not clear from this illustration, but are within the manual ability of a person skilled in the art.

To load the housing 1, the door 2 is opened and, for example, woodchips or a bale of waste paper, not illustrated, can be transported into the housing 1. The door 2 is subsequently closed and locked, so that the housing interior is sealed off, airtight and vapor tight, from the surroundings.

The path along which the paper bale, not illustrated, can be loaded into the apparatus and unloaded from it is indicated by a double arrow 10.

It is, of course, advantageous if the housing interior can be negotiated by a lift truck or another transport appliance, so that one or more bales of waste paper which are located, for example, on a Europallet can be introduced into the housing interior quickly and simply with the aid of a lift truck.

Various lines, with the aid of which the moistening of the woodchips or of the wastepaper (not illustrated) can take place, issue into the housing 1.

A supply line is designated by reference symbol 4. The supply line contains a regulating valve 5.

The liquid with which the fibrous material is to be moistened can be introduced in liquid and/or vaporous form through the supply line into the interior of the housing 1 according to demand. As a rule, water is used for moistening. However, it is also possible to provide the water with various additives or to employ another liquid, such as, for example, digesting liquor.

It goes without saying that a conveying device, not illustrated, such as, for example, a pump, and/or a storage tank, is located upstream of the regulating valve.

A vacuum line is designated by reference symbol 6. This vacuum line 6 has a first directional valve 7 which is usually designed as a switchable 2/2-way valve, a vacuum vessel 19 and a vacuum generator 20. The vacuum vessel 19 is merely optional. If such a vacuum vessel 19 is present, the vacuum generator 20 can have relatively small dimensioning and can suck air or vapor out of the vessel 19 continuously. When the directional valve 7 is opened, a lowering of pressure can be carried out very quickly and effectively in the inner space of the housing 1, even though the vacuum generator 20 has relatively small dimensioning. It goes without saying that the volume of the vacuum vessel 19 and the volume of the housing 1 and also the power of the vacuum generator 10 must be coordinated with one another.

Reference symbol 8 identifies a pressure line into which a second 2/2-way valve 9 is integrated.

This pressure line 8 is connected to a compressor 15 and to a pressure vessel 16. Here, too, the pressure vessel 16 serves for increasing the running time of the compressor 15 and at the same time for reducing the required power of the compressor 15.

The pressure line 8 is necessary only when an overpressure is to be generated after the lowering of the pressure in the inner space of the housing 1.

Optionally, air, vapor or a liquid can be conducted into the housing 1 via the pressure line 8.

A ventilation line is designated by reference symbol 11. A third directional valve 12 is provided in this ventilation line 11.

The apparatus according to the invention operates as follows:

With a door 2 open, the fibrous material to be moistened is conveyed into the housing 1. The door 2 is subsequently closed in an airtight and vapor tight manner.

The first directional valve 7, second directional valve 9 and third directional valve 12 are first closed. With the regulating valve at least partially open, the medium required for moistening the paper (not illustrated) containing the housing 1 is conveyed in a vaporous and/or liquid state through the supply line 4 into the interior of the housing 1.

The regulating valve 5 is subsequently closed, and the first directional valve 7 is quickly opened. The interior of the housing 1 is thereby connected to the vacuum vessel 19, and pressure compensation takes place between the two vessels. The pressure inside the housing 1 consequently falls abruptly to values of between 0.9 bar and 0.1 bar, preferably to values of between 0.7 bar and 0.3 bar.

As soon as the desired underpressure has been reached in the housing 1, the first directional valve 7 is closed and, immediately thereafter, the third directional valve 12 is opened, so that pressure compensation between the surroundings and the inside of the housing can take place. The "abrupt" compensation is in this case especially important. It must take place as quickly as the fibers and cavities, which have collapsed due to the vacuum, also endeavor to recover their original form.

If desired, after a few seconds, the third directional valve 12 can be closed again and the second directional valve 9 opened. A few seconds or even only less than one second may elapse between the closing of the third directional valve 12 and the opening of the second directional valve 9. Since the pressure line 8 is connected to the pressure vessel 16, pressure compensation between the pressure vessel 16 and the inside of the housing 1 takes place immediately after the opening of the second directional valve 9. Consequently, the pressure inside the housing rises to values above the ambient pressure. Overpressures of between 0.1 bar and 1 bar are preferred.

When a desired overpressure inside the housing 1 has been reached, the second directional valve 9 is closed, and this overpressure is maintained for several seconds, for example 5 seconds, but preferably for less than two seconds. The cycle then commences from the outset. So that the overpressure does not have to be broken down by the vacuum generator 20, the third directional valve 12 can be opened briefly beforehand, so that the overpressure breaks down via the ventilation pressure compensation line 11.

Figure 21:
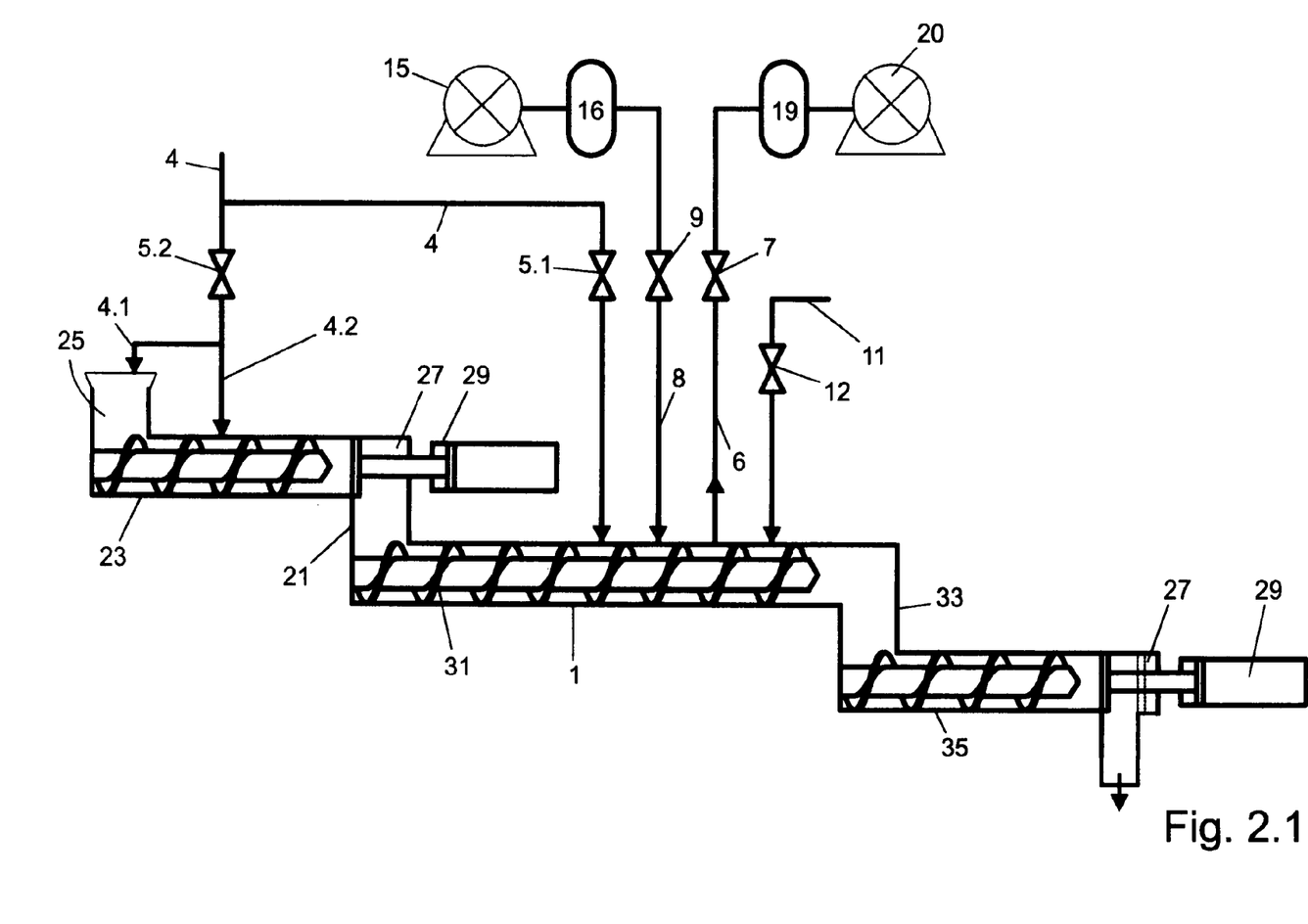

FIG. 2.1 shows a second exemplary embodiment of an apparatus according to the invention which is preferably operated continuously, but may also be used batchwise.

The housing 1 is designed as a cylindrical tube.

A first orifice 21 is provided at the end, on the left in FIG. 2.1 of the housing 1. This first orifice 21 is preceded by a first plug screw 23 and a filling funnel 25. Between the first orifice 21 and the plug screw 23 is arranged a valve 27 which can be actuated via an actuator 29, for example in the form of a pneumatic cylinder. FIG. 2.1 illustrates the first closing valve 27 in the closed position. The position of the open valve 27 is illustrated by dashes.

As is clear from FIG. 2.1, the supply line 4 is branched so that one branch of the supply line 4 issues directly in the housing 1 via the regulating valve 5.1, while further branches 4.1 and 4.2 issue respectively into the filling funnel 25 and into the plug screw 23.

Upstream of the branches 4.1 and 4.2, a second regulating valve 5.2 is provided, which likewise serves for controlling the liquid quantity flowing into the apparatus according to the invention.

The plug screw 23 is constructed in a similar way to a conventional conveyor worm. The essential difference is that the pitch of the conveyor worm decreases in the conveying direction, so that, in addition to the conveying movement, compression of the conveyed material is also carried out. However, the plug screw may also additionally taper conically.

The fibrous material to be moistened, preferably in the form of woodchips, together with, for example, water, is administered into the filling funnel 25 and is subsequently conveyed by the first plug screw 23 in the direction of the housing 1. Simultaneously with a conveying movement, compression of the conveyed woodchips takes place, so that a pressure-tight plug is formed in the first plug screw 23. Sealing off of the housing interior from the surroundings is thereby achieved. As a rule, it is sufficient to seal off the orifice 21 by means of the plug screw 23 or the woodchips compressed by it. However, as illustrated in FIG. 2.1, a closing valve 27 may also additionally be provided.

When the first plug screw 23 has conveyed the woodchips and the water through the first orifice 21 into the housing, this mixture of woodchips and water is conveyed slowly through the housing 1 via conveyor worm 31 which is arranged inside the housing 1. While the material is being conveyed through the housing 1, the pressure alternation described in connection with the exemplary embodiment according to FIG. 1 takes place. The woodchips are thereby moistened. After the woodchips have been conveyed through the housing 1 by the conveyor worm 31, they fall through the second orifice 33 into a second plug screw 35. A closing valve 27 and an actuator 29 actuating the closing valve 27 are likewise arranged at the end of the second plug screw 35. It is thereby possible also to close off the second orifice 33 of the housing in a pressure tight and vapor tight manner at any time. The conveyor worm 31 may even be dispensed with if the housing 1 is suitably placed obliquely.

When the closing valve 27 at the end of the second plug screw 35 is opened or when the pressure of the plug screw 35 is higher than the pressure of the actuator 29, the moistened woodchips and any excess water present can fall downward out of the apparatus according to the invention.

The exemplary embodiment of an apparatus according to the invention, as described with reference to FIG. 2, may selectively be operated continuously or batchwise, since woodchips can be conveyed at any time into the housing 1 by the first plug screw 23 and the moistened woodchips can be conveyed out of the housing 1 with the aid of the second plug screw 35.

Figure 22:
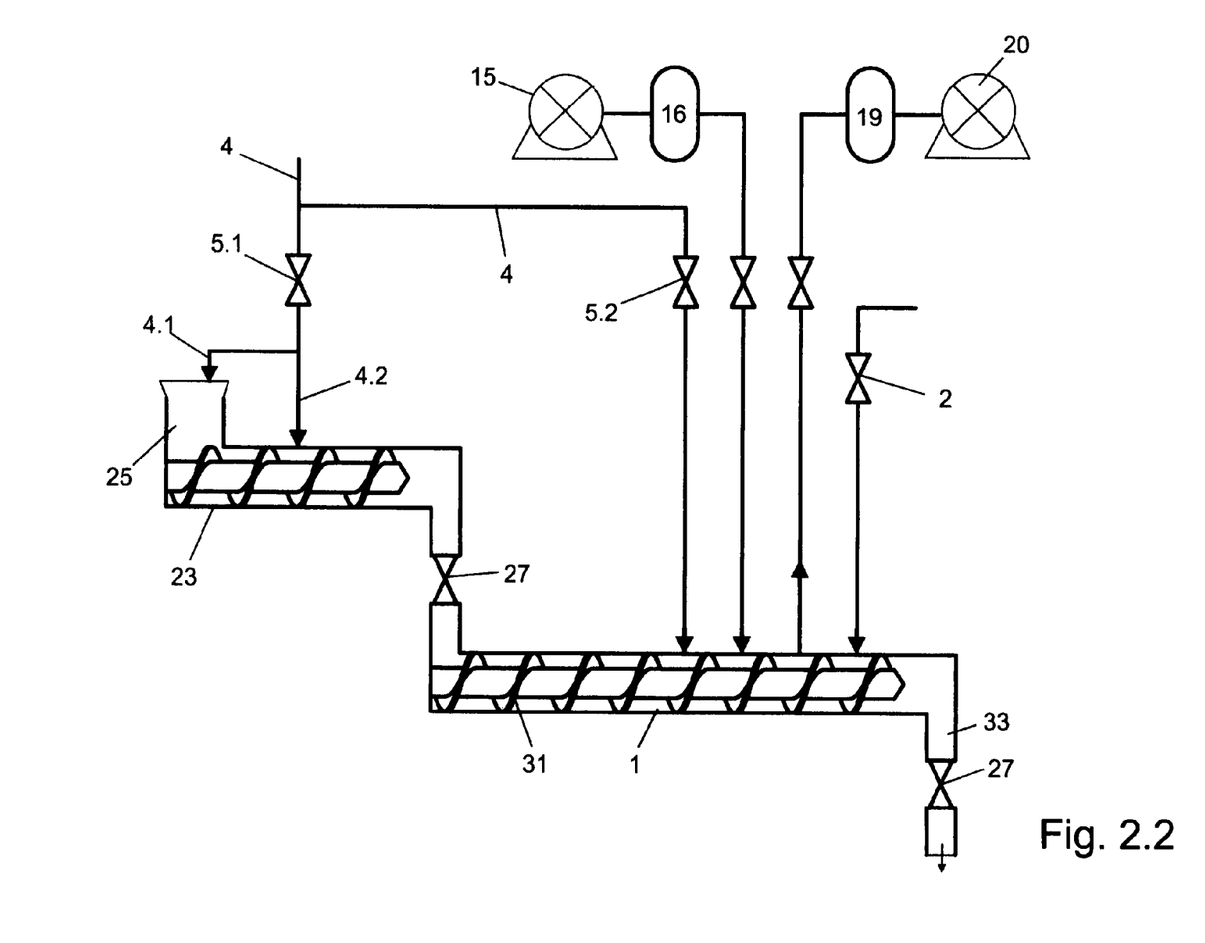

It is also possible to dispense with the second plug screw 35 and to close the second orifice 33 solely by means of the closing valve 27. Such an embodiment is illustrated in FIG. 2.2.

Figure 31:
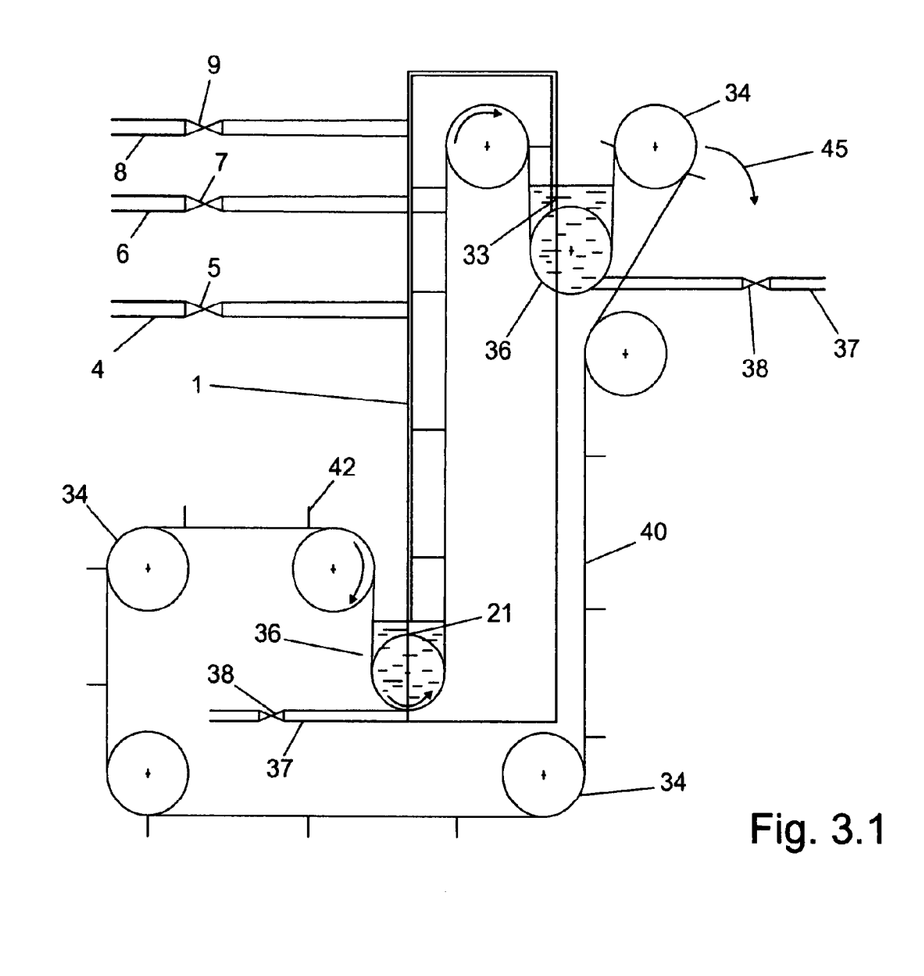

In the exemplary embodiment illustrated in FIG. 3.1, the first orifice 21 and the second orifice 33 of the housing 1 are closed by means of a drain trap 36. The drain traps 36 contain water or another suitable barrier liquid. The filling level of the barrier liquid is set via the supply lines 37 and the regulating valve 38 such that there is no direct connection between the atmosphere inside the housing 1 and the ambient air. For this purpose, it is advantageous if the first orifice 21 and the second orifice 33 are arranged on a vertical wall of the housing 1.

A conveyor belt 40 is led through the first orifice 21 and the second orifice 33 and the drain traps 36 and guides the fibrous material (not illustrated) to be moistened into the interior of the housing 1. The deflecting rollers belonging to the conveyor belt 40 have been given the reference symbol 34. Teeth 42 are arranged on the conveyor belt 40 and also make it possible to transport the fibrous material in a vertical direction and counter to gravitational force. The supply line 4, the vacuum line 6 and the pressure line 8 issue into the housing 1. The inflow and outflow through these lines are controlled with the aid of the valves 5, 7 and 9 in the way already described above.

Figure 32:
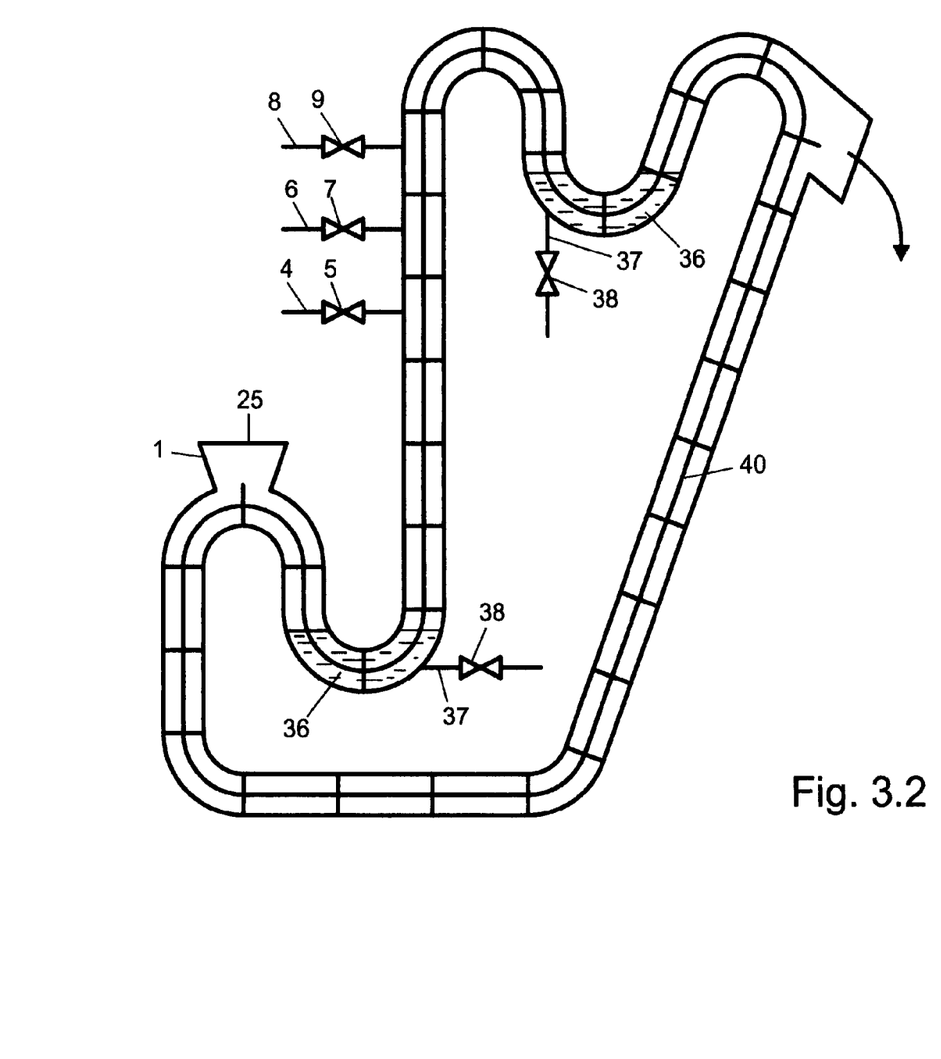

FIG. 3.2 shows a further exemplary embodiment of an apparatus according to the invention with a drain trap and a conveyor belt, here a tubular chain conveyor.

Figure 4:
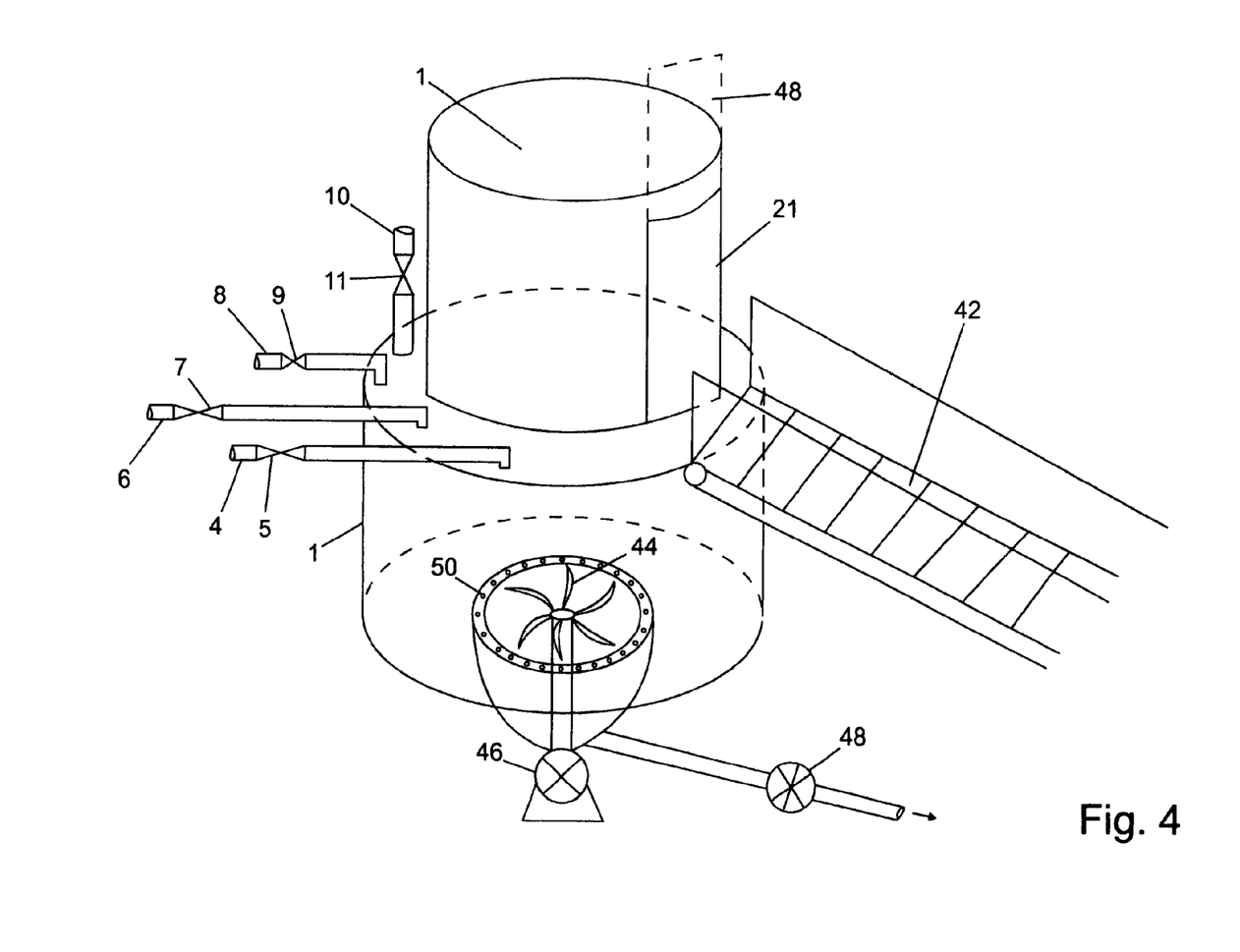
FIG. 4 shows an exemplary embodiment of an apparatus according to the invention which combines the functions of a pulper and of an apparatus according to the invention for the moistening of fibrous material.

FIG. 4 illustrates a further exemplary embodiment of an apparatus according to the invention for wetting fibrous material, which is suitable especially for wetting individual or several waste paper or pulp bales, paper in sheets and split paper rolls.

This apparatus can be produced by converting a conventional pulper is also suitable for retrofitting such pulpers. The pulper, and also the cowl mounted on top, must be adapted to or designed for the pressure conditions prevailing in the invention.

The fibrous material is administered into the housing 1 by means of a conveying device 42 through the open orifice 21. A slide 48 is subsequently moved down and the orifice 21 is thereby closed.

The regulating valve 5 of the supply line 4 is opened, and wetting liquid, in particular water, is added to the desired level. When the level is reached, the regulating valve 5 is closed again.

A motor 46 is subsequently switched on in that a rotor 44 is set in rotation. Intermixing of the waste paper or pulp bales contained in the housing 1 and of the wetting liquid thereby takes place.

As regards the lines 4, 6 and 8, reference is made to what was said regarding these lines in connection with the preceding exemplary embodiments.

After the fibrous material has been moistened, a pump 48 is switched on and the moistened fibrous material is pumped away via a perforated plate 50. The charging of the pulper and moistening then commence anew.

Since the complete moistening of the fibrous material takes place in a very short time (<2 minutes) and completely moistened fibrous material can immediately be comminuted very effectively at little outlay in terms of energy, it can even be pumped away continuously via the perforated plate 50. Nonfibrous material (for example, films, wires) can be removed periodically, as already happens now, through a large outward transfer orifice (not illustrated) or by means of grab crane apparatus through orifices, not illustrated, in the pulper cowl.

Owing to the wetting times, which are very short on account of this apparatus, and therefore very short degrading and residence time of the waste paper in the pulper, the paper fibers can be detached very quickly from plastic films or other coatings and pumped away via the perforated plate 50. These nonfibrous materials can thereby be removed from the pulper housing 1 in markedly larger fragments. Moreover, the currently customary outlay for resorting the fibrous material which has been pumped away via the perforated plate 50 can thereby be reduced very sharply.

The invention claimed is:

1. An apparatus for moistening fibrous material by the alternating pressure method, with an airtight and vapor tight housing and with a vacuum line, a first directional valve being provided in the vacuum line, the housing having at least one closable orifice for loading and unloading the housing, and a ventilation line, and a third directional valve being provided in the ventilation line, wherein the vacuum line is connected to a vacuum vessel, and in that the first directional valve is arranged between the housing and the vacuum vessel.

2. The apparatus as claimed in claim 1, wherein the housing has a closable first orifice for loading the housing and a closable second orifice for unloading the housing.

3. The apparatus as claimed in claim 1, wherein the at least one orifice can be closed by means of a door, a flap, a slide, a valve, a plug screw, a sluice and/or a drain trap.

4. The apparatus as claimed in claim 1, wherein a supply line for the medium with which the fibrous material is moistened is present, and in that a regulating valve is provided in the supply line.

5. The apparatus as claimed in claim 1, wherein a pressure line is provided, and in that a second directional valve is provided in the pressure line.

6. The apparatus as claimed in claim 5, wherein the pressure line is connected to a pressure vessel, and in that the second directional valve is arranged between the housing and pressure vessel.

7. The apparatus as claimed in claim 5, wherein the pressure line is connected to a compressed air generator.

8. The apparatus as claimed in claim 1, wherein the vacuum line is connected to a vacuum generator.

9. The apparatus as claimed in claim 1, further comprising at least one conveying device for conveying the fibrous material through the apparatus.

10. The apparatus as claimed in claim 9, wherein the at least one conveying device is designed as a conveyor worm, a transport belt and/or a chain conveyor.

11. The apparatus as claimed in claim 1, wherein one or more housings are connected in parallel and/or in series to one another.

* * * * *